Figure 6:
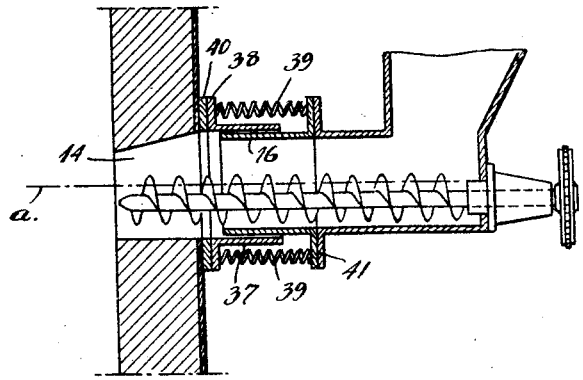

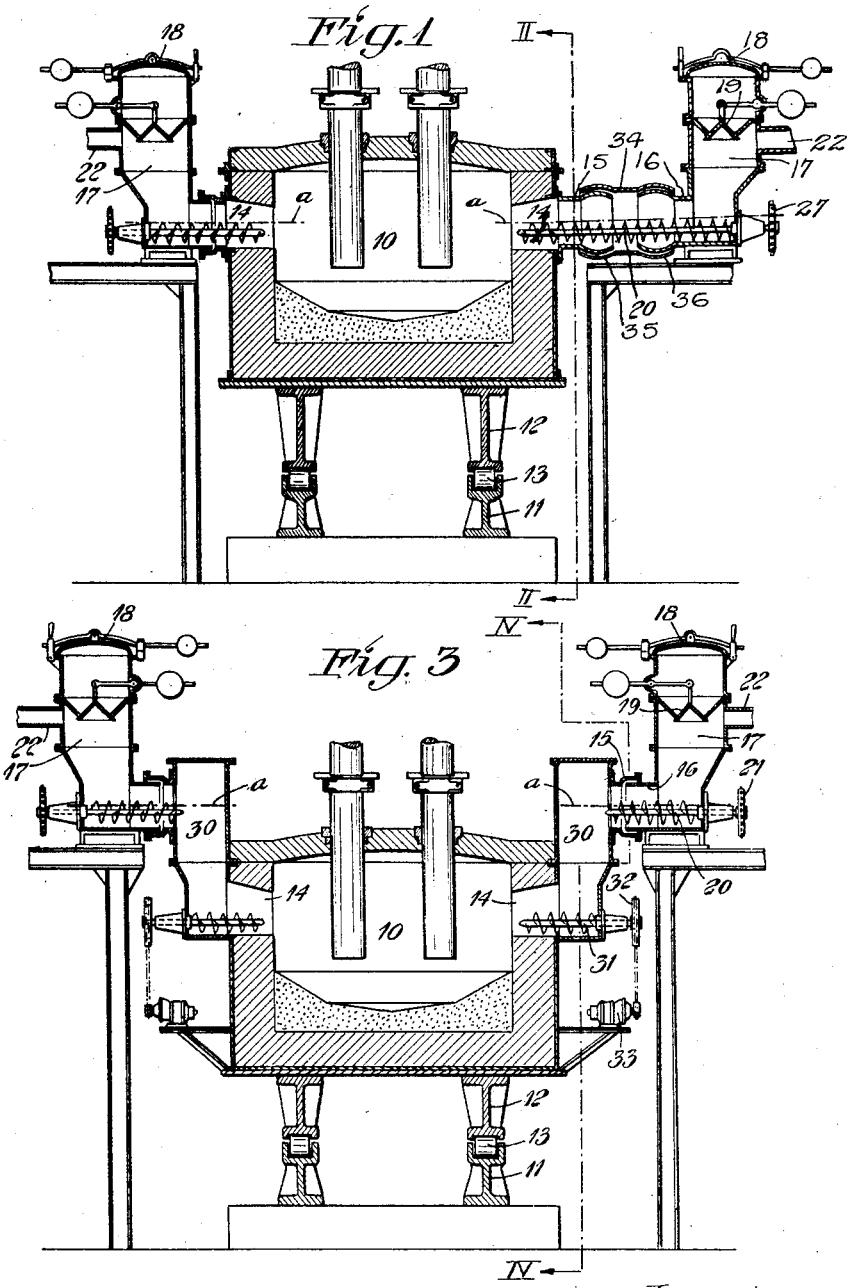

March 3, 1931. E. G. T. GUSTAFSSON ET AL 1,794,455
CLOSED TILTABLE FURNACE
Filed March 31, 1926 3 Sheets-Sheet 2
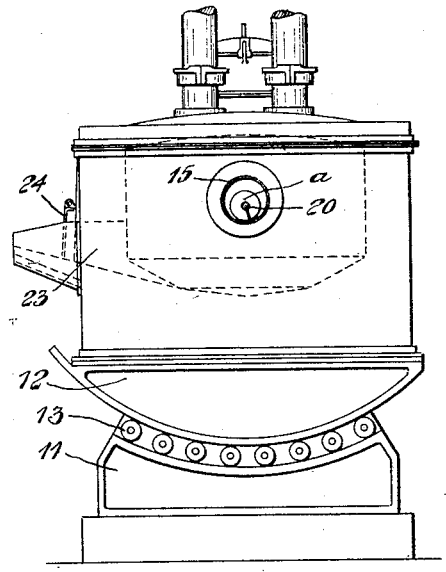
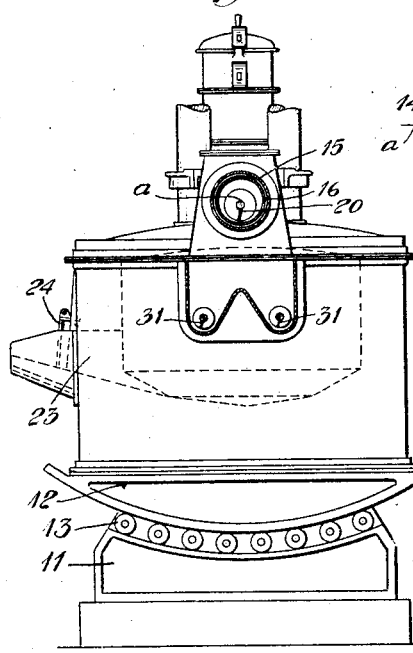
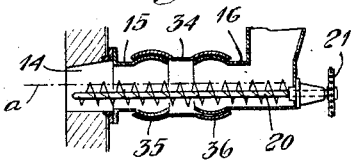
Inventors.
Emil Gustaf Torvald Gustafsson,
and Bengt Ivar Norén.
per
Attorney.

March 3, 1931.  E. G. T. GUSTAFSSON ET AL  1,794,455
CLOSED TILTABLE FURNACE
Filed March 31, 1926  3 Sheets-Sheet 3

INVENTORS
Emil G. T. Gustafsson
Bengt Ivar Norén
by
Attorney

Patented Mar. 3, 1931

1,794,455

UNITED STATES PATENT OFFICE

EMIL GUSTAF TORVALD GUSTAFSSON AND BENGT IVAR NORÉN, OF STOCKHOLM, SWEDEN, ASSIGNORS TO HAMPUS GUSTAF EMRIK CORNELIUS, OF STOCKHOLM, SWEDEN

CLOSED TILTABLE FURNACE

Application filed March 31, 1926, Serial No. 98,766, and in Sweden December 23, 1925.

The present invention refers to closed tiltable furnaces and especially to certain means for charging the furnace and, if desired, for removing gas from the same without the interior of same being brought, even during the operation of the furnace, into direct communication with the open air. The invention may especially be applied to tiltable or rockable electric furnaces, for continuous operation, i. e. when the charge is fed continuously or at certain intervals, into the furnace.

In stationary furnaces it is easy to arrange the apparatus for charging the furnace and, if desired, for removing gas from the same in such a manner that the charging material may be, while the furnace is operated, introduced into the furnace and gas may be removed from the same, without the interior of the furnace being brought into direct communication with the open air.

It is, however, very difficult not to say impossible to empty a stationary furnace entirely, when tapping the same. This is a serious disadvantage when materials of different composition are to be produced in subsequent smeltings. In tiltable furnaces, which are tapped through a lateral opening located above the level of the material or the bath in the furnace, this disadvantage is eliminated, as, on tilting the furnace to a sufficient degree, molten metal or other residues in grooves or corrosions, that may occur in the bottom of the furnace, can be entirely removed therefrom. Consequently, no product will remain at the bottom of the furnace from one charge to another, and the furnace may be repaired, when required, as soon as tapped and before the next charge is introduced.

It is of special importance that the furnace can be entirely emptied on tapping when iron and steel as well as iron alloys are produced from ore and reducing agent or when spongy iron or some other metalliferous product, produced in another furnace or apparatus, is smelted. Tiltable furnaces are for this reason preferred for any such production or smelting. The material or the charge must be supplied in such a manner, that the interior of the furnace is not brought into direct communication with the open air, which however, has not been possible in tiltable furnaces hitherto used or proposed.

In processes running continuously or in processes in which material is fed into the furnace in small quantities at intervals during the charging, tiltable furnaces have not, however, hitherto been used, except possibly in the special form of revolving furnaces in which the material to be treated is introduced at the one end of the furnace and the treated material or the product is removed at the other end thereof. Revolving furnaces have, however, not been found to be convenient for processes in which the material is transferred from a solid into a molten state.

If, on the whole, any feeding device or any device for removing gas has been used or proposed in combination with a tiltable furnace, said device has been rigidly connected with the furnace and, consequently, has partaken in the tilting movements of the furnace. The feeding devices have in such a case to be of a heavy and therefore expensive construction on account of the great stresses caused by the tilting. Gas flowing through said feeding devices or escaping from the furnace in any other way must be led off through a pipe, connected to a stationary gas conduit outside the furnace for collecting the gas, and consequently said pipe must be disconnected from said conduit prior to the furnace leaving its ordinary position. Such a connecting and disconnecting of the furnace to and from the stationary conduit respectively is troublesome and tedious and shortens the time during which, for instance, when using an electric furnace, the available current and the furnace can be used for actual production. Moreover, more current will be required for making up for the loss of heat during such stoppages.

The present invention refers to closed tiltable furnaces adapted for lateral tapping and in which, during running, material is to be fed into the furnace and, if desired, gas is to be removed from same for further utilization, and refers to special improvements in such furnaces whereby the above mentioned disadvantages may be eliminated.

The main object of the invention is to provide a furnace of the type described having a hollow connection for charging the furnace, in combination with a stationary apparatus and means to effect communication between said apparatus and said connection in any position of the furnace.

Another object of the invention is to provide a furnace of the type described having an adjoining hollow connection for charging the furnace, the centre line of the contiguous part of said connection coinciding with the tilting axis of the furnace.

A still further object of the invention is to provide a furnace of the type described having a chamber, movable with the furnace and communicating with the interior thereof and with an adjoining hollow connection for charging the furnace, the centre line of the contiguous part of said connection coinciding with the tilting axis of the furnace.

A still further object of the invention is to provide mechanical means for charging the furnace in said connection or in said chamber or at both said places, said means consisting preferably of a screw, or the like. In a preferred embodiment mechanical means are disposed at the bottom of said chamber and are adapted to charge the furnace at a plurality of points of the circumference thereof.

A still further object of the invention is to provide a furnace of the type described with an opening in the furnace wall or any part movable with the furnace for introducing material into the furnace, said opening being so disposed in relation to the tilting axis of the furnace that its centre will maintain its position on the tilting movements of the furnace, and a stationary apparatus for introducing material into the furnace being movably or slidingly connected to said opening in a permanent or practically permanent position. The apparatus for charging the furnace is, consequently, an immovable, that is to say a fixedly anchored apparatus, and in relation to said apparatus the opening in the furnace as well as the furnace itself move on tilting the furnace for the purpose of tapping or emptying same. The connection between the furnace and the stationary apparatus should, of course, be such that it is practically air- and gastight, for instance by means of a suitable packing.

It is to be understood that said opening in the furnace wall or in the chamber wall and said stationary apparatus or feeding device may be adapted to remove gas from the furnace, said gas being formed therein during the process or used therein in the process, also that said opening and said apparatus may be adapted to fulfill both said purposes.

The stationary apparatus for charging the furnace is preferably so formed for the connection with the furnace that the part nearest to the furnace is wholly or partly cylindrical, for instance, has the form of a pipe, the centre line of which coincides or nearly coincides with the tilting axis of the furnace, that is to say with the line around which the furnace turns on tilting. This part of the apparatus may be connected with the opening of the furnace or with a pipe surrounding or constituting said opening, the centre of which coincides with said tilting axis. Preferably, said cylindrical part extends into or surrounds the opening or said pipe respectively, or said part may abut against it by means of a suitable machined surface. The opening or the pipe of the furnace will on tilting turn around, within or in contact with the cylindrical part of the stationary apparatus. It is evident, that a certain clearance must be provided between said parts in order to permit the tilting movements of the furnace. Preferably the joint may be made tight by means of a packing or a movable collar on the one part pressing against the other part.

The construction of the connection between the furnace and the apparatus described above implies that the tilting of the furnace takes place in such a manner that the tilting axis will be practically stationary. This is for instance the case when the furnace on its underneath side is provided with cylindrical rails or the like moving on rollers, as in revolving furnaces, or with rollers or balls on corresponding cylindrical fixed tracks, supporting the furnace, or when the furnace is pivotally mounted on fixed bearings. In the last mentioned case said pivots may preferably constitute the connecting pipes of the furnace, whereas the cylindrical parts of the stationary apparatus are formed as supporting bearings of the furnace. However, the invention is not limited to the arrangements for supporting and tilting the furnace as mentioned above, said arrangements being only examples of special embodiments of the invention.

If the stationary apparatus is to be used for removing gas from the furnace, said apparatus consists preferably of a pipe rigidly connected to the stationary conduit for collecting the gas.

If the stationary apparatus is to be used for introducing material into the furnace and, perhaps, also for removing gas from same, mechanical feeding means are provided in the cylindrical part of the apparatus, said means consisting for instance of a screw or the like, extending into the opening of the furnace to a sufficient distance for introducing the material into the same. It is evident, that the cylindrical part may also be rotatably disposed in the opening of the furnace, introducing the material into the furnace for instance by means of screw-shaped ribs or the like provided on its inner surface. Said mechanical means takes the material, for instance, from a shaft or chamber provided in the stationary apparatus, into which shaft or chamber the material may be introduced by means of double closures or in any other suitable manner so as to prevent air from entering the lower portion of the apparatus as well as gas from escaping from same. Gas that may escape from the furnace through said cylindrical part is preferably led from the shaft or chamber by means of an outlet pipe on the same, rigidly connected to a conduit for collecting the gas. In order to facilitate the passage of the gas through the connecting part of the furnace and that of the apparatus, the screw or the like may be given a smaller diameter than the opening of the furnace or the cylindrical part of the apparatus respectively. By placing the screw or piston in an eccentrical position in said parts, a space will be formed above the screw or piston which space will only in part be filled by material, and consequently the gas can easily escape from the furnace through said space and enter the shaft or chamber of the stationary apparatus.

By the arrangement described material may be introduced into the furnace at two or more points, depending upon the number of stationary apparatuses used. One of said apparatuses may, of course, be adapted for charging the furnace and another for removing of gas from same, if desired. However, the charging of the furnace and the removing of gas from same will, in this case, be confined to openings disposed around the tilting axis of the furnace. In several cases it is, however, desirable to have the opening or openings into the interior of the furnace disposed, in relation to vertical or lateral directions, at places more suitable for the operation of the furnace so as to permit a better distribution of the material, for instance, onto the bath in the furnace, that is to say to supply the material at a plurality of points of the circumference not necessarily located around the tilting axis. Maintaining the same principles for charging the furnace and removing the gas the furnace arrangements should be somewhat modified in such case. In the furnace wall or onto the same is provided a chamber into which the material is introduced through an opening in its outer wall from a stationary apparatus of the above mentioned construction having a movable connection to said opening in the chamber wall, said opening being, preferably, so located that its centre line coincides or nearly coincides with the tilting axis of the furnace. In said chamber, preferably at the bottom of same, one or more mechanical feeding devices are provided, for instance screws or pistons, which are adapted to introduce the material into the furnace at the desired points. On using a plurality of screws or pistons in the lower portion of said chamber, the upper opening for the introduction of material into the chamber should preferably be disposed at such a level so as to permit a uniform distribution of the material to the different feeding devices. If gas is to be removed from the furnace through the feeding openings, such openings are preferably given a greater diameter than the feeding screws which are disposed eccentrically in said openings. In order to distribute the material within the chamber any suitable mechanical means, for instance a screw conveyor or the like, may be provided in the same. In this way, consequently, the material may be introduced into the furnace at a plurality of points. By arranging the upper opening of the chamber at a higher level that the devices for feeding the material into the furnace chamber proper, also the tilting axis of the furnace may be located at a higher level than will be the case, if the material is fed into the furnace chamber directly from the stationary apparatus. The increased radius of the path of the tilting movement of the furnace thus obtained will involve the advantage of said movement becoming more smooth and uniform, preventing to a large extent the bending stresses in the connection to the stationary apparatus.

For the purpose of decreasing such bending stresses occurring on tilting the furnace the connection between the opening of the furnace or the chamber respectively and the stationary apparatus may preferably be provided with one or more ball joints. By such an arrangement the pipe on the furnace, for instance, may be prevented from being jammed in the pipe of the feeding apparatus, any irregularity of the tilting movement being taken up by said ball joints.

The driving means for the feeding devices, for instance an electric motor and chains or belts to pulleys on the different screws, is preferably rigidly connected to the furnace or the bottom plate of the same, movable therewith, so that the said driving means will maintain its position in relation to the feeding devices on tilting the furnace. By these means it will not be necessary to disengage said chains or belts, when the furnace is to be tilted.

If gas is formed in the furnace and the material is hot or the gas has a high temperature it is preferred, for the purpose of protecting the feeding devices, to draw off the gas through a special opening in the furnace wall into a part of said chamber at a higher level than that where said devices for feeding the material into the furnace chamber are located. In this case the openings from the chamber into the furnace chamber are only slightly greater than the screws or the pistons in same.

In the accompanying drawing Figs. 1 and 2 show an embodiment of an arrangement according to the present invention for charging a closed tiltable electric furnace with material through an opening leading to the furnace chamber proper, the centre line of said opening coinciding with the tilting axis of the furnace.

Figure 7:
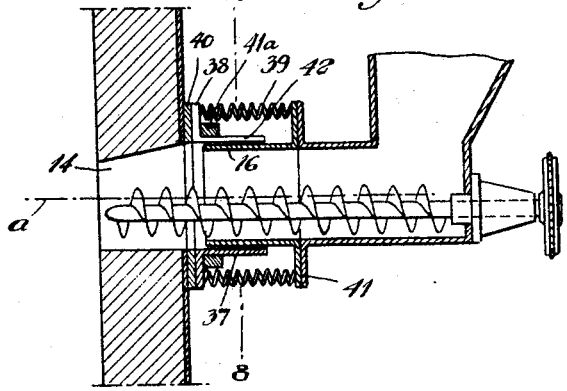
Figure 8:
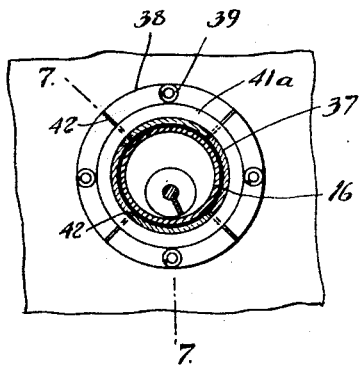

Fig. 1 is a vertical section through a furnace and feeding device according to the present invention, and Fig. 2 is a section along the line II—II in Fig. 1. Fig. 3 is a vertical section through another embodiment of a furnace according to the invention and Fig. 4 a section along the line IV—IV in Fig. 3. Fig. 5 shows a section of the connection between furnace and feeding apparatus, Fig. 6 shows a section of another embodiment of said connection and Figs. 7 and 8 show yet another way of connecting the furnace opening and the stationary apparatus. Figs. 6, 7 and 8 are drawn to an enlarged scale as compared with the other figures. Fig. 8 is a cross-section along the line 8—8 of Fig. 7. Like reference numerals refer to corresponding parts in all figures.

As shown in these figures the adjoining connection of the furnace and the part of the feeding device lying nearest the furnace are wholly cylindrical, which is not, however, absolutely necessary. 10 designates the smelting chamber of the furnace which rests on the circular shaped supports 11 by means of rails 12 and rollers 13. On tilting, which is performed for instance by means of a toothed segment (not shown) disposed on the underneath side of the furnace and a toothed gear driven by a reversible electric motor, the furnace will turn around the line $a$ as turning axis. The furnace is provided with two feeding openings 14 and fitted to each of said openings 14 is a pipe 15 secured to the furnace, said pipes 15 being so disposed that their centre lines coincide with the tilting axis $a$ of the furnace. Extending into each of said pipes 15 is a pipe-shaped part 16 of a feeding apparatus 17, said apparatus consisting of a stack in which the material to be treated is introduced through the two closures 18 and 19, that is to say in such a manner as to prevent the interior of the furnace from coming into direct communication with the open air. Arranged in the lower portion of the stack is a screw 20 extending a certain distance into the opening 14. By means of this screw 20 which is driven from the pulley 21 by a suitable driving motor, the material is fed into the furnace from the stack. In the embodiment shown the screw is placed in an eccentrical position in the pipes 15 and 16 having its centre line below that of the pipes. A space is hereby obtained in the pipe above the screw, through which space gas formed in the furnace may escape into the stack from which it is removed through the pipe 22 connected to a stationary conduit for collecting the gas. On tilting the furnace for the purpose of tapping or emptying same, the furnace will turn around the axis $a$, whereby the contents thereof will wholly or partly be removed through the lateral opening 23 which can be closed by the door 24. The pipes 15 of the furnace will then rotate within the pipes 16 of the feeding devices. Tightening between the pipes 15 and 16 may be accomplished in known manner by suitable packing in the connecting sleeve or by covering the clearance between the pipes, for instance, with mortar, after the furnace has been turned back into ordinary position.

In Fig. 1 the furnace is shown as provided with two feeding devices, but it is evident, that only one device may be used, if desired.

By means of the feeding apparatus shown in Figs. 1 and 2, material can be introduced into the furnace only at one or two points. As previously stated, it is, however, often necessary to supply the material at a plurality of points, for instance for the purpose of effecting a more uniform distribution of the material over the surface of the bath in the furnace, for instance, when producing iron or steel directly out of ore. In Figs. 3 and 4 an arrangement of this kind is shown. From the stationary feeding device 17 the material is, in this embodiment, introduced into a chamber 30 through the pipe 16 of the feeding apparatus and the pipe 15 secured to the wall of said chamber. The chamber 30 is provided with two screw conveyors 31 driven by the pulleys 32 from the electric motor 33 secured to the furnace. The centre line of the pipes 15 and 16 coincides with the tilting axis $a$ of the furnace. On tilting, the pipe 15 will turn around the pipe 16 whereby the connection between the furnace and the feeding apparatus will be maintained. In this embodiment two screws are shown in the lower portion of the chamber 30, but evidently, any suitable number of screws may be used. The provision of a separate chamber connected with the furnace may be suitable, even if only one feeding screw is used for introducing the material from the chamber 30 into the interior of the furnace, due to the fact that the radius of the path, along which the furnace moves, will be increased, thereby making it easier to handle the furnace.

In Fig. 5 a suitable arrangement is shown for decreasing the risk of the pipes 15 and 16 being jammed during the tilting movements, said arrangement consisting of a pipe 34 having two ball joints 35 and 36 and disposed between the pipes 15 and 16. The screws 20 extends through this connecting pipe a suitable distance into the opening 14 of the furnace wall or into the pipe 15 on the chamber wall. Any irregularities in the tilting movements will only cause corresponding movements in the ball joints 35 and 36.

In Fig. 6 another connection between the furnace opening and the stationary apparatus is shown. In this embodiment tightening is effected by means of the pipe 37 provided with a flange 38 and slidingly disposed around the pipe 16 of the stationary apparatus, said pipe 37 being pressed by means of springs 39 against the flange 40 surrounding the opening 14 in the furnace wall or in the chamber wall respectively, said springs 39 acting between said flanged pipe 37 and a flange or projections 41 on the stationary apparatus. Another advantage is also gained by means of this arrangement consisting in the connection becoming flexible whereby any expansion of the furnace due to heating for instance when starting the furnace, will only cause a compression of the springs so that the flanges will be more forcibly pressed against each other, but any tendency for jamming will be eliminated.

In Figures 7 and 8 is shown yet another way of connecting the furnace opening and the stationary apparatus, which is a modification of the embodiment shown in Fig. 6. In order to equalize any lateral movement on tilting the furnace, the pipe 37 shown in Fig. 6 may be provided with a plurality of longitudinal slots 42 forming thereby a plurality of parts which are maintained in position by a collar 41a placed around same and permitting longitudinal movements of each of said parts along the pipe 16.

What we claim as new and desire to secure by Letters Patent of the United States of America is:—

1. A closed tiltable furnace adapted for lateral tapping and having a chamber, forming part of the furnace and communicating with the interior thereof and with an adjoining hollow connection, mechanical means at the bottom of said chamber for charging the furnace at a plurality of points of the circumference thereof, the centre line of the contiguous part of said connection coinciding with the tilting axis of the furnace.

2. A closed tiltable furnace having a chamber, forming part of the furnace and communicating with the interior thereof and with an adjoining hollow connection, mechanical means in said chamber for charging the furnace, a motor movable with the furnace for driving said mechanical means, the centre line of the contiguous part of said connection coinciding with the tilting axis of the furnace.

3. A closed tiltable furnace having a hollow connection to a stationary feeding apparatus, comprising mechanical means for charging the furnace through said connection the centre line of one part of said connection coinciding with the tilting axis of the furnace.

4. A closed tiltable furnace adapted for lateral tapping and having a chamber, movable with the furnace and communicating with the interior thereof and with an adjoining hollow flexible connection for communicating with a stationary apparatus, the centre line of the contiguous part of said connection coinciding with the tilting axis of the furnace.

5. A closed tiltable furnace adapted for lateral tapping and having a chamber, movable with the furnace and communicating with the interior thereof and with an adjoining hollow connection for charging the furnace and removing gas from the same, the centre line of the contiguous part of said connection coinciding with the tilting axis of the furnace.

6. A closed tiltable furnace adapted for lateral tapping and having a chamber, movable with the furnace and communicating with the interior thereof and with an adjoining hollow connection to a stationary feeding apparatus comprising mechanical means for charging the furnace through said connection, the centre line of the contiguous part of said connection coinciding with the tilting axis of the furnace.

7. In combination with a closed tiltable furnace adapted for lateral tapping and having a chamber, movable with the furnace and communicating with the interior thereof and with an adjoining hollow connection, the centre line of the contiguous part of said connection coinciding with the tilting axis of the furnace, of a stationary apparatus and means to effect communication between said apparatus and said connection in any position of the furnace.

In testimony whereof we affix our signatures.

EMIL GUSTAF TORVALD GUSTAFSSON.
BENGT IVAR NORÉN.